(12) United States Patent
Jongerius et al.

(10) Patent No.: US 12,168,672 B2
(45) Date of Patent: Dec. 17, 2024

(54) PROCESSED LIGNIN AND PROCESS TO PREPARE SUCH

(71) Applicant: Avantium Knowledge Centre B.V., Amsterdam (NL)

(72) Inventors: Anna Louise Jongerius, Amsterdam (NL); Scott Henry Russell, Amsterdam (NL); Kay Jochem Damen, Amsterdam (NL); Benjamin McKay, Amsterdam (NL)

(73) Assignee: Avantium Knowledge Centre B.V., Amsterdam (NL)

( * ) Notice: Subject to any disclaimer, the term of this patent is extended or adjusted under 35 U.S.C. 154(b) by 540 days.

(21) Appl. No.: 17/616,105

(22) PCT Filed: Jun. 8, 2020

(86) PCT No.: PCT/EP2020/065787
§ 371 (c)(1),
(2) Date: Dec. 2, 2021

(87) PCT Pub. No.: WO2020/259991
PCT Pub. Date: Dec. 30, 2020

(65) Prior Publication Data
US 2022/0298194 A1  Sep. 22, 2022

(30) Foreign Application Priority Data

Jun. 25, 2019  (EP) ..................................... 19182146

(51) Int. Cl.
*C07G 1/00* (2011.01)
(52) U.S. Cl.
CPC ..................................... *C07G 1/00* (2013.01)
(58) Field of Classification Search
CPC ....................................................... C07G 1/00

USPC ........................................................ 530/500
See application file for complete search history.

(56) References Cited

U.S. PATENT DOCUMENTS

| | | |
|---|---|---|
| 2,778,751 A | 1/1957 | Riehm |
| 3,251,716 A | 5/1966 | Frank |

FOREIGN PATENT DOCUMENTS

| | | |
|---|---|---|
| WO | 2014178911 A1 | 11/2014 |
| WO | 2017039439 A1 | 3/2017 |
| WO | 2019149833 A1 | 8/2019 |

OTHER PUBLICATIONS

Constant, S. et al., "New insights into the structure and composition of technical lignans: a comparative characterisation study", Green Chemistry, vol. 18 No. 9 May 7, 2016 pp. 2563-2910.
International Search Report mailed Jul. 22, 2020 for PCT/EP2020/065787.

*Primary Examiner* — David T Karst
(74) *Attorney, Agent, or Firm* — Suiter Swantz IP

(57) ABSTRACT

Processed lignin comprising the elements carbon (C), hydrogen (H) and oxygen (O) in the following amounts:
C in an amount of between 60 and 85% by weight,
H in an amount of between 3.0 and 6.0% by weight,
O in an amount of between 10 and 29% by weight,
wherein the weight ratio C/H is at least 12.5, the ratio C/O is at least 2.5, the processed lignin comprises less than 0.1% by weight of total Cl, a sulphur content below 1 g/kg, and a moisture content less than 3% by weight.
A process to prepare the processed lignin comprising subjecting particles comprising lignin and cellulose and optionally hemicellulose to acidic hydrolysis using hydrochloric acid of at least 35%, subjecting the obtained residue to a high temperature treatment of between 300 and 500° C. under inert gaseous atmosphere to a total Cl level of below 0.1% by weight, after drying.

5 Claims, No Drawings

PROCESSED LIGNIN AND PROCESS TO PREPARE SUCH

INTRODUCTION

The invention relates to processed lignin, which processed lignin has a specific amount of carbon, hydrogen and oxygen. The invention further relates to a process to prepare such. More specifically, such process relates to subjecting particles comprising cellulose and lignin (and optionally hemicellulose) to an acidic hydrolysis step using hydrochloric acid, followed by subjecting the remaining particles to a step in which the elemental composition is modified by subjecting to a temperature of between 300 and 500° C. under inert gaseous atmosphere. The particles comprising cellulose and lignin used in such process may be from biomass.

BACKGROUND OF THE INVENTION

Lignin is a component that is usually present together with cellulose and hemicellulose in vegetable biomass such as plants and trees. Lignin is generally present in an amount of 15-45%, cellulose in an amount of 25-55% and hemicellulose in an amount of 20-50% (all weight % on dry biomass). The amounts depend on the source of the biomass, but amounts also differ seasonally and geographically. Next to these main components, minors like minerals and resins may be present.

Lignin is a class of complex organic polymers that form key structural materials in the support tissues of vascular plants and some algae. Lignins are particularly important in the formation of cell walls, especially in wood and bark, because they lend rigidity to the material they are part of and are resistant to rot. Chemically, lignins are cross-linked phenolic polymers, the lignol monomers mainly being coniferyl alcohol, sinapyl alcohol, and p-coumaryl alcohol. The complex of these components is cross-linked together through carbon—carbon, ester, and ether linkages. The result is a very complex structure, with differences per species of plant, geography of growth, part of the plant, etcetera, but all are collectively referred to as lignin.

Given that lignin is a component that is present in substantial amounts in biomass, it is abundantly available in the world. Despite such abundance, the economic use of lignin so far is limited. This is partly due to its complex structure, but also to the fact that it is present in biomass jointly with other components such as cellulose and/or hemi-cellulose. However, since lignin is a component that can be obtained from renewable sources it has recently gained more interest. Potential usage can be e.g. in construction and building materials when compounded together with e.g. (phenolic) resins and polymers such as polyhydroxybutyrate. The entire economic potential for using lignin has yet to be discovered. A key requirement for such is that there needs to be a process for obtaining lignin or a processed version of lignin, and that such lignin or processed lignin should have desirable properties.

A well-known process for producing lignin, and also commercialized, is the Kraft process. The Kraft process is in essence a process aimed at manufacturing paper from wood, and the lignin is a side-product. A distinct disadvantage of the Kraft process is that lignin so-produced has a high content of sulphur, which for many applications is undesired. The sulphur in such lignin is not from the origin of the biomass material, but ends up in the lignin due to the chemical components used in the process.

Other processes exist that may also lead to lignin, one of them is the so-called Organosolv process. Lignin produced by an Organosolv process contains less sulphur. The process was developed as an environmentally more friendly process to the above mentioned Kraft pulping. It yields a lignin which is soluble in polar organic solvents and mixtures of these solvents with water. For potential application of lignin in composites or coatings, however, a low solvent and water permeability of the lignin is important. An additional disadvantage of lignin obtained by the Organosolv process is that it is obtained from a solution, and following that the lignin particles are very fine (small) particles. Such small particles (in essence a powder) has certain disadvantages that particulates of sufficient size do not have, e.g. in storage and transportation. An example of this is the risk on dust explosions.

Still other known processes may lead to lignin that contains a substantial amount of chloride (free and bound) which may also be detrimental to some potential applications. An example of such process is described in U.S. Pat. No. 3,251,716. In the process disclosed therein, wood chips are subjected to 41-45% hydrochloric acid in a digester, which acid hydrolyses part or all of the sugars and leaving a lignin residue. The lignin residue leaving the digester is sent to a centrifuge. The lignin discharged from the centrifuge is entered in a lignin dryer, wherein the lignin is dried by a water-hydrochloric acid vapor super-heated to a temperature of 340-360° C. The water-hydrochloric acid vapor is cooled, condensed and recirculated to the digester. The lignin so-obtained is stated to be substantially dry.

Thus, there is a desire for lignin or processed lignin which has a moderate to low amount of sulphur and other elements which can limit its application like total chloride (free and/or bound), yet which (processed) lignin has low solubility in organic solvents and a low solubility in and/or low permeability for water. Consequently, there is also a desire for a process that enables obtaining such (processed) lignin from renewable biomass sources. Such process usually starts with removing the cellulose and hemicellulose present with the lignin in the biomass. It is furthermore desirable that such processed lignin can be obtained in particulates of substantial size (e.g. a size above the limit under which dust explosions with this matter may easily occur). In a process involving hydrolysis with hydrochloric acid, recovery of hydrochloric acid from products (like hydrolysates) and residues (like lignin) is desired. This is desired from an economical point of view (it requires less new hydrochloric acid). Apart from recovery, it is desired that products and residues produced contain as little as possible hydrochloric acid and/or chloride, as presence of these components severely limits application fields. The presence of chloride can make products severely corrosive. For example, burning lignin containing substantial amounts of chloride will corrode furnaces quickly, which is clearly undesired. Similarly, for utilization as fillers in e.g. composite materials or for making objects of it is desired that amounts of chloride in the lignin are very low. Also moisture and/or residual sulphur in lignin limits its applicability, and hence these components are preferably present in lignin only in limited amounts.

SUMMARY OF THE INVENTION

It has now been found that the above objective(s) can be met, at least in part, by processed lignin, which processed lignin comprises the elements carbon (C), hydrogen (H) and oxygen (O) in the following amounts:

carbon in an amount of between 60 and 85% by weight, hydrogen in an amount of between 3.0 and 6.0% by weight, oxygen in an amount of between 10 and 29% by weight, wherein the weight ratio carbon/hydrogen C/H is at least 12.5 and the weight ratio C/O is at least 2.5, and wherein the processed lignin comprises less than 0.1% by weight of total Cl, wherein it has a sulphur content of below 1 g/kg, and wherein the moisture content of it is less than 3% by weight.

The invention further relates to a process for preparing a processed lignin containing less than 0.1% by weight of total Cl, wherein such processed lignin can be obtained by a process comprising the steps of subjecting particles comprising lignin and cellulose and optionally hemicellulose to:
a. acidic hydrolysis using hydrochloric acid of at least 35% by weight so that at least 60% by weight of the cellulose is hydrolysed, yielding hydrolysate and a particulate residue,
b. wherein said residue is dried to a moisture content of less than 3% by submitting the residue to a temperature of less than 240° C. under an inert atmosphere, and said drying step is carried out such that it recovers at least part of the hydrogen chloride used in step a,
c. subjecting the obtained particulate residue to a high temperature treatment of between 300 and 500° C. under inert gaseous atmosphere to a total Cl level in the particulate residue of below 0.1% by weight.

It was found that the processed lignin according to the above and which can be made by the process set out has a limited solubility in most common solvents, notably polar organic solvents. It was also found that the processed lignin as specified above and according to this invention can be obtained by the process as specified herein.

DETAILED DESCRIPTION OF THE INVENTION

In the present invention, "processed lignin" is to be understood as a lignin which has been modified chemically, wherein the chemical modifications can be induced by a heat treatment, and which lignin comprises less than 10% by weight of residual carbohydrates. "Residual carbohydrates" herein relates to pentoses, hexoses, their oligomers and polymers. The amount of residual carbohydrates in lignin in this are determined by a method which largely follows NREL Lab Procedure: NREL/TP-510-42618 and ASTM E1758-01.

In the present invention, the analysis of the amounts of the elements carbon (C), hydrogen (H), oxygen (O) in the composition according to the present invention are determined along the lines of European Standard EN 15104:2011 (Solid biofuels—Determination of total content of carbon, hydrogen and nitrogen—Instrumental methods).

In the present invention, sulphur and total Cl in lignin and in the composition according to the present invention are measured following European Standard EN 15289:2011 (Solid biofuels—Determination of total content of sulfur and chlorine). "Total Cl" herein refers to the sum of all chloride ions and all covalently bound chlorine atoms.

In the present invention, metals like potassium and sodium in the composition according to the present invention are measured by ICPMS.

In the present invention, moisture is determined by comparing weight before and after drying for 16 hours at 105° C.

It was found that the processed lignin containing less than 0.1% by weight of total Cl according to the present invention can be produced by a process of the Bergius-Rheinau type (i.e. relying on hydrolysis of (hemi)cellulose by strong hydrochloric acid using vegetable biomass as a source), which process has an additional step in subjecting the obtained lignin to a specific high temperature treatment (step c. above) after a drying step b. The specific high temperature treatment alters the chemical composition in that some mass is lost, but also the weight ratio carbon over hydrogen and carbon over oxygen changes, and total Cl residues due to the hydrochloric acid treatment are also removed to a large extent. In connection to the latter, the it is preferred that step c. is carried out to such an extent that the composition contains less than 0.05% by weight of total Cl, more preferably less than 0.03% by weight. Having a low total Cl content greatly enhances economic value, as lignin with substantial levels of total Cl may lead to corrosion of equipment.

It was found that both from a product property point of view and process efficacy point of view the process is preferably carried out to such an extent that the composition according to the invention has a weight ratio C/H (weight ratio carbon over hydrogen) of between 12.5 and 20.0, more preferably between 12.8 and 19.0, and most preferably between 13.0 and 18.0. If in the process of manufacturing the heating is e.g. conducted at higher temperatures than claimed both the C/H and C/O ratio of the composition changes beyond the ratio's now claimed but also more lignin mass is lost. Similarly, it is preferred that a manufacturing process is conducted such that the weight ratio C/O (weight ratio carbon over oxygen) of the composition is between 2.5 and 6.0, preferably between 2.6 and 5.0, more preferably between 2.7 and 4.5. Hence, it is preferred that the processed lignin according to the present invention has a weight ratio C/H of between 12.5 and 20.0, preferably of between 12.8 and 19.0, more preferably of between 13.0 and 18.0. Likewise, it is preferred that the processed lignin according to the present invention has a weight ratio C/O of between 2.5 and 6.0, preferably of between 2.6 and 5.0, more preferably of between 2.7 and 4.5. The present invention in particular is suitable when the biomass used to make the processed lignin according to the present invention is wood, including both hardwood and softwood. This is in particular so as then processing is easy. Hence, the processed lignin according to the present invention preferably is of the origin wood, including softwood and hardwood.

The processed lignin according to the present invention is preferably dry for multiple potential uses, and such dry lignin is also obtained by the now claimed process. Hence, in the present invention the processed lignin according to the present invention has a moisture content being less than 3% by weight, more preferably less than 2% by weight, and most preferable less than 1% by weight. As stated earlier, it is preferred that processed lignin has a low content of sulphur, lower than is usually achieved for Kraft lignin. It was found such can be achieved. Hence, the processed lignin of the present invention has a sulphur content of below 1 g/kg, preferably below 500 mg/kg, more preferably below 250 mg/kg.

It was found that the composition according to the present invention is quite low in potassium, only lignins produced by the Organosolv method seem to have similar ratio's. This provides benefits in use. Hence, it is preferred that the composition according to the present invention has an amount of potassium being less than 40 mg/kg, more preferably less than 30 mg/kg.

As stated, the process according to the invention uses as raw material (particulates of) lignin comprising cellulose and optionally hemicellulose. Typically, such raw material is or comprises vegetable biomass. When such raw material is subjected to the process steps as specified herein a large part of the cellulose (and hemicellulose when present in the raw material) will have been hydrolysed to monosaccharides, disaccharides and oligosaccharides and will have leached out, leaving lignin largely undamaged. This may be solely lignin or lignin combined with some hydrolysed or incompletely hydrolysed remains of cellulose or hemicellulose. In such case, the product according to the present invention may contain processed lignin next to some remains of cellulose and/or hemicellulose and also some degradation products, next to unreacted (aqueous) hydrogen chloride.

Step a. of the process as specified herein can be conveniently carried out as a static bed of biomass particles through which the hydrogen chloride solution flows, e.g. as a plug. This is facilitated if the biomass particles have a certain size. Too small and the system may block, too big and the hydrolysis may be negatively affected. Thus, it is preferred that the particulate matter comprising lignin and cellulose and optionally hemicellulose on which the process of this invention is carried out is in the form of particulate solid material having a particle size of at least P16A and at most P100, preferably P45A or P45B, conforming European Standard EN 14961-1 on solid biofuels.

The resulting processed lignin particulates may have the same size as is used as biomass particles in the process of the present invention. This sets it apart from e.g. lignin produced by the Organosolv process which is obtained from a dissolved lignin fraction, and which by definition will yield a very fine powder of processed lignin. Notwithstanding the remark above that the processed lignin particles may have the same size as the particulate solid material used as starting material, the process may also include a pressing step after step a. to remove most of the aqueous hydrochloric acid after hydrolysis by mechanical force, prior to subjecting the particles to step b. and/or a drying by heating process. Such mechanical pressing is optional, but may result in processed lignin particles which are smaller than the ones that were used as starting material. Still, if such pressing is employed, a processed lignin may be obtained of which at least 60%, preferably at least 70%, more preferably at least 80% by weight has a mesh-sieve size larger than 100 µm. Hence, e.g. following such pressing, it may be preferred that the processed lignin is particulate matter wherein at least 60% by weight, preferably at least 70% by weight has a mesh-sieve size larger than 100 µm.

The carbohydrate composition according to the present invention may be made by any suitable process. As mentioned above, it has been found that such composition may suitably be prepared using a process which comprises the steps of subjecting particles comprising lignin and cellulose and optionally hemicellulose to:
  a. acidic hydrolysis using hydrochloric acid of at least 35% by weight so that at least 60% by weight of the cellulose is hydrolysed, yielding hydrolysate and a particulate residue,
  b. wherein said residue is dried to a moisture content of less than 3% by submitting the residue to a temperature of less than 240° C. under an inert atmosphere, and said drying step is carried out such that it recovers at least part of the hydrogen chloride used in step a,
  c. subjecting the obtained particulate residue to a high temperature treatment of between 300 and 500° C. under inert gaseous atmosphere to a total Cl level of below 0.1% by weight.

In the above process, in step a. the particles comprising lignin and cellulose and optionally hemicellulose are contacted with aqueous hydrochloric acid of at least 35% by weight to effect hydrolysis of at least part of the cellulose, so that residue particles are obtained rich in lignin. Due to the contact with the aqueous hydrochloric acid, the particles obtained from such process (step a.) may be wet. Dry particles are obtained due to first subject the particulate residue from step a. to a drying step b. prior to subjecting to step c. Hence, in the process according to the present invention said process comprising a step of drying the obtained particulate residue from step a. prior to submitting such to step c., wherein said residue is dried to a moisture content of less than 3% by submitting the residue to a temperature of less than 240° C. under an inert atmosphere, and preferably said drying step is carried out such that it recovers at least part of the hydrogen chloride used in step a.

In the process according to the present invention it is preferred that the high temperature treatment step c. is conducted at a temperature of between 320 and 480° C., preferably at a temperature of between 340 and 460° C., even more preferably at a temperature of between 350 and 450° C., balancing between obtaining the desired elemental composition and mass loss. Preferably, high temperature treatment step c. is carried out for a duration of between 5 and 240 minutes, preferably for a duration of between 7 and 180 minutes, more preferably for a duration of between 10 and 120 minutes. Also, the high temperature treatment step c. is preferably carried out under an inert gaseous atmosphere comprising nitrogen, fluegas, carbon dioxide, or mixtures thereof. This step c. may suitable be carried out in a tubular reactor.

The acidic hydrolysis in step a. may be carried out according to ways as set out in the prior art, either as a single step or in multiple stages. An example of the latter is set out in PCT/EP2019/052404, in which first a hydrolysis of hemicellulose is carried out followed by a hydrolysis of cellulose. Such process is a preferred process.

In the process according to the present invention the optional drying step is carried out such that it recovers at least part of the hydrogen chloride used in step a. Such hydrogen chloride recovery may be carried out by a process as set out in WO2017039439.

The invention further relates to the use of a temperature treatment of at least 300° C., preferably a temperature treatment of between 350 and 500° C., more preferably between 350 and 450° C., under inert gaseous atmosphere to reduce the total Cl content and/or to modify the chemical composition such as the amount of hydrogen and/or oxygen of a lignin obtained by subjecting biomass comprising lignin and cellulose and optionally hemicellulose to acid hydrolysis of which acid hydrolysis is carried out using hydrochloric acid in a concentration of at least 35% by weight. Preferably, the biomass in such use comprises wood particulates.

EXAMPLES

Example 1

Pre-Processing to Obtain a Crude Lignin Sample

Pinewood chips (Dutch pinewood) were subjected to the process as set out in PCT/EP2019/052404 (process conditions similar to example 2, but manual control). The lignin obtained was washed, pressed to squeeze out most water, thus crushing also the lignin particles to coarse, granular powder and particles a few mm in size.

Lignin Drying

So-obtained lignin particles were dried in an oven at atmospheric pressure under airflow atmosphere at 105° C. for 16 hours. No actual moisture content was determined for the sample subjected to elemental analysis and reported below, but on comparable lignin samples (same wood, same processing) moisture levels were 2.6% (+1-1%) by weight.

Results

The so-produced lignin (i.e. hydrochloric acid-hydrolysed, dried, but not heat-treated) was subjected to elemental analysis (using the method as set out under "Detailed description of the invention"). The results are set out in table 1, and a comparison is given with literature data (S. Constant et al, Green Chemistry, Volume 18 Number 9 7 May 2016 Pages 2563-2910) on other (mostly commercial) lignins.

TABLE 1 elemental analysis of various processed lignins.

|  | Example 1 | Indulin Kraft | Soda P1000 | Alcell | Organosolv wheat str. | Organosolv poplar | Organosolv spruce |
| --- | --- | --- | --- | --- | --- | --- | --- |
| C (wt %) | 61.75 | 63 | 64 | 67 | 66 | 66 | 68 |
| H (wt %) | 5.7 | 5.7 | 5.7 | 5.9 | 6 | 5.7 | 5.8 |
| O (wt %) | 29.5 | 27 | 28 | 27 | 28 | 29 | 27 |
| C/H | 10.8 | 11.0 | 11.2 | 11.3 | 11.0 | 11.6 | 11.7 |
| C/O | 2.1 | 2.3 | 2.3 | 2.5 | 2.4 | 2.3 | 2.5 |
| K (mg/kg) | < 25 | 1072 | 2142 | 48 | 52.9 | 21.6 | 17.1 |
| S (mg/kg) | 212.75 | 16752 | 9540 | 162 | 961.4 | 264.8 | 164.6 |

Example 2

Thermogravimetric Analysis (TGA) and Elemental Analysis on Heat-Treated Lignin

Dried woodchips as obtained by the process as set out under example 1, after drying the particles were ground to a powder of which more than 40% based on weight has a particle size between 100 and 200 micrometer (as determined by sieve analysis). The material was subjected to a heat treatment in the following way. The samples (about 30-40 mg each time) were placed in TGA crucible. The samples were processed using a Mettler Toledo TGA/DSC 3+ under a flow of nitrogen of 80 mL/min. Heating was started from room temperature to a setpoint (see table 2 under Results) by 5° C. per minute and cooled back to room temperature once they reached the setpoint.

Results

TGA processing to each setpoint temperature was performed on 5 separate samples resulting in the average mass loss, reported in table 2 below. The 5 samples which have reached the same temperature were combined to be analysed on elemental analysis on content of carbon, hydrogen, oxygen, and total Cl, using the methodology as set out above under "Detailed description of the invention". The results are set out in table 2 below. The detection limit for total Cl is about 0.03 wt. %, and for a few samples the amount of total Cl was below the detection limit.

TABLE 2 weight loss and elemental analysis data of the treated lignin

| Furnace temperature ° C. | Average mass loss (wt %) | Elemental analysis (wt %) | | | | Wt ratio C/H | Wt ratio C/O |
| --- | --- | --- | --- | --- | --- | --- | --- |
| | | C | H | O | total Cl | | |
| — | — | 61.42 | 5.67 | 29.00 | 1.05 | 10.83 | 2.12 |
| 200 | 4.7 | 62.80 | 5.73 | 28.55 | 0.94 | 10.96 | 2.20 |
| 250 | 8.3 | 64.54 | 5.61 | 27.20 | 0.47 | 11.50 | 2.37 |
| 300 | 12.6 | 65.59 | 5.42 | 25.85 | 0.18 | 12.10 | 2.54 |
| 350 | 22.0 | 69.31 | 5.13 | 24.25 | 0.05 | 13.51 | 2.86 |
| 400 | 34.8 | 72.08 | 4.50 | 21.05 | <0.03 | 16.02 | 3.42 |
| 450 | 43.9 | 74.26 | 3.82 | 19.50 | <0.03 | 19.44 | 3.81 |
| 500 | 48.2 | 76.95 | 3.64 | 17.25 | <0.03 | 21.14 | 4.46 |
| 550 | 51.4 | 80.55 | 3.36 | 13.50 | <0.03 | 23.97 | 5.97 |

From this example it can be concluded that heating lignin obtained by acid hydrolysis of biomass can result in a lignin which has a total Cl content below the detection limit, and a modified amounts of carbon, hydrogen and oxygen. Also, weight ratio's C/H and C/O had shifted.

Example 3

Pre-Processing

For example 3, three samples of pinewood lignin (obtained in the same way as under pre-processing of example 1) were subjected to three different drying regimes as set out below, to investigate the impact of various drying conditions on the elemental composition after subsequent heating processes, to two different heating temperatures, under otherwise the same processing conditions as for example 2 under TGA processing above. Also, one sample of a different kind of wood, notably rubberwood, was subjected to the same processing as in example 2 (albeit only two temperatures for the heat treatment, and subjected to elemental analysis.

Example 3a: pinewood, dried at 240° C. for 50 minutes, after heating up from 20° C. by about 2.3° C. per minute.

Example 3b: pinewood, dried at 220° C. for 60 minutes, after heating up from 20° C. by about 2.3° C. per minute.

Example 3c: pinewood, dried at 220° C. for 30 minutes, after heating up from 20° C. by about 2.3° C. per minute.

Example 3d: rubberwood, dried at 105° C. for 16 hours.

Results Pre-Processing

The processed lignin samples so produced were analysed on moisture content, sulphur content and residual carbohydrates, and the results are set out in table 3 below.

TABLE 3 basic analysis of samples on moisture, residual carbohydrates and sulphur.

| example | moisture (wt % on wet basis) | residual carbohydrates | sulphur (wt % on dry basis) |
|---|---|---|---|
| 3a | 0.78 | 3.07 | 0.01 |
| 3b | 1.79 | 0.7 | 0.01 |
| 3c | 2.58 | 6.79 | 0.01 |
| 3d | 2.7 | 0.25 | 0.08 |

TGA Processing and Elemental Analysis

TGA processing and elemental analysis was as in example 2. The results are set out in table 4 below.

TABLE 4

Weight loss and elemental analysis data of 4 different lignin samples

| Lignin | treatment | Weight loss (wt %) | Elemental analysis (wt %) | | | Wt total Cl | Wt ratio C/H | ratio C/O |
|---|---|---|---|---|---|---|---|---|
| | | | C | H | O | | | |
| 3a | untreated | — | 61.73 | 5.95 | 29.1 | 0.89 | 10.37 | 2.12 |
| 3a | 350° C. | 21.9 | 68.87 | 5.20 | 24.2 | 0.04 | 13.24 | 2.85 |
| 3a | 400° C. | 36.5 | 72.47 | 4.39 | 21.4 | 0.03 | 16.51 | 3.39 |
| 3b | untreated | — | 64.62 | 5.74 | 27.3 | 0.38 | 11.26 | 2.37 |
| 3b | 350° C. | 15.7 | 69.65 | 5.27 | 24.4 | 0.02 | 13.22 | 2.85 |
| 3b | 400° C. | 29.1 | 72.28 | 4.45 | 21.8 | 0.01 | 16.24 | 3.32 |
| 3c | untreated | — | 60.80 | 5.88 | 29.6 | 0.85 | 10.34 | 2.05 |
| 3c | 350° C. | 21.3 | 68.73 | 5.06 | 24.3 | 0.03 | 13.58 | 2.83 |
| 3c | 400° C. | 35.4 | 71.84 | 4.48 | 21.8 | 0.03 | 16.04 | 3.30 |
| 3d | untreated | — | 56.75 | 5.72 | 31.3 | 4.26 | 9.92 | 1.81 |
| 3d | 350° C. | 29.0 | 68.14 | 5.08 | 24.6 | 0.07 | 13.41 | 2.77 |
| 3d | 400° C. | 42.1 | 72.04 | 4.31 | 21.7 | 0.05 | 16.71 | 3.32 |

Example 4

Solubility at room temperature of three types of lignin was investigated in some common solvents:
acid-hydrolysed lignin made according to step a. of the process as disclosed herein (and as in example 1), not having been subjected to the heat processing step b.;
processed lignin according to the present invention;
commercial lignin (Green Value, Protobind 1000) made by the Soda-process.

Procedure

Around 20 mg of lignin was weighed and placed in a sample vial, one ml of solvent was added and the mixture was dispersed well. After 3 hours the solubility of lignin in the solvent was assessed (by eye) based on the discoloration and amount of precipitate and ranked on a 5-point scale (from -- to ++):
-- Completely insoluble
- Light discoloration of the liquid
+- Strong discoloration of the liquid, a lot of solid precipitate
+ Strong discoloration of the liquid, small amount of solids present
++ Everything is in solution Results The processed lignin according to the present invention showed no solubility at all. The char like material did not even disperse well in any of the polar solvents. The commercial Green Value lignin showed behavior which is expected for technical lignins with a good solubility in NaOH and dmso and partial solubility in acetone and ethanol.

TABLE 5

Results of the small-scale solubility test for lignin

| vial | material | weight (mg) | solvent | ml | solubility |
|---|---|---|---|---|---|
| 1 | a-h lignin* | 19.8 | water | 1 | -- |
| 2 | a-h lignin | 20.1 | 1M NaOH | 1 | - |
| 3 | a-h lignin | 20.3 | 0.1M NaOH | 1 | - |
| 4 | a-h lignin | 19.7 | ethanol | 1 | -- |
| 5 | a-h lignin | 19.6 | dmso | 1 | - |
| 6 | a-h lignin | 20.4 | acetone | 1 | -- |
| 7 | processed lignin | 19.3 | water | 1 | -- |
| 8 | processed lignin | 19.2 | 1M NaOH | 1 | -- |
| 9 | processed lignin | 20.8 | 0.1M NaOH | 1 | -- |
| 10 | processed lignin | 21.7 | ethanol | 1 | -- |
| 11 | processed lignin | 19.3 | dmso | 1 | -- |
| 12 | processed lignin | 20.2 | acetone | 1 | -- |
| 13 | Green Value | 18.9 | water | 1 | -- |
| 14 | Green Value | 21 | 1M NaOH | 1 | ++ |
| 15 | Green Value | 23 | 0.1M NaOH | 1 | ++ |
| 16 | Green Value | 24 | ethanol | 1 | +- |
| 17 | Green Value | 20.7 | dmso | 1 | ++ |
| 18 | Green Value | 19.2 | acetone | 1 | +- |

*a-h lignin: acid-hydrolysed lignin made according to step a.

The invention claimed is:

1. A process for preparing a processed lignin containing less than 0.1% by weight of total Cl, wherein the process comprises the steps of subjecting particulate matter comprising lignin and cellulose and optionally hemicellulose to:
   a. acidic hydrolysis using hydrochloric acid of at least 35% by weight so that at least 60% by weight of the cellulose is hydrolysed, yielding hydrolysate and a particulate residue,
   b. wherein said residue is dried to a moisture content of less than 3% by submitting the residue to a temperature of less than 240° C. under an inert atmosphere, and said drying step is carried out such that it recovers at least part of the hydrogen chloride used in step a,
   c. subjecting the obtained particulate residue to a high temperature treatment of between 300 and 500° C. under inert gaseous atmosphere to a level of total Cl in the particulate residue level of below 0.1% by weight.

2. The process according to claim 1, wherein the processed lignin comprises the elements carbon (C), hydrogen (H) and oxygen (O) in the following amounts:
   carbon in an amount of between 60 and 85% by weight
   hydrogen in an amount of between 3.0 and 6.0% by weight,
   oxygen in an amount of between 10 and 29% by weight, wherein the weight ratio carbon/hydrogen C/H is at least 12.5 and the ratio C/O is at least 2.5, and wherein the processed lignin comprises less than 0.1% by weight of total Cl, wherein it has a sulphur content of below 1 g/kg, and wherein the moisture content of it is less than 3% by weight.

3. The process according to claim 1, wherein said high temperature treatment step c. is conducted at a temperature of between 320 and 480° C.

4. The process according to claim 1, wherein the dried residue is subjected to the high temperature treatment step c. for a duration of between 5 and 240 minutes.

5. The process according to claim 1, wherein the high temperature treatment step c. is carried out under an inert gaseous atmosphere comprising nitrogen, fluegas, carbon dioxide, or mixtures thereof.

\* \* \* \* \*